United States Patent
Farmer

(10) Patent No.: US 7,362,007 B2
(45) Date of Patent: Apr. 22, 2008

(54) HYBRID UNINTERRUPTIBLE POWER SUPPLY SYSTEM

(76) Inventor: Walter Emory Farmer, 385 Wyldewoode Dr., McDonough, GA (US) 30253

(*) Notice: Subject to any disclaimer, the term of this patent is extended or adjusted under 35 U.S.C. 154(b) by 0 days.

(21) Appl. No.: 11/440,533

(22) Filed: May 24, 2006

(65) Prior Publication Data
US 2006/0267411 A1  Nov. 30, 2006

Related U.S. Application Data

(60) Provisional application No. 60/684,840, filed on May 26, 2005.

(51) Int. Cl.
  *H02J 1/00* (2006.01)
(52) U.S. Cl. .................................... 307/72; 307/73
(58) Field of Classification Search .............. 307/66, 307/72, 73
  See application file for complete search history.

(56) References Cited

U.S. PATENT DOCUMENTS

| | | | |
|---|---|---|---|
| 3,600,661 A * | 8/1971 | Briggs et al. ............... | 320/150 |
| 5,126,585 A | 6/1992 | Boys | |
| 5,384,792 A * | 1/1995 | Hirachi ....................... | 714/14 |
| 5,642,100 A | 6/1997 | Farmer | |
| 5,751,564 A | 5/1998 | Dien | |
| 5,939,799 A | 8/1999 | Weinstein | |
| 6,201,319 B1 * | 3/2001 | Simonelli et al. ............. | 307/26 |
| 6,445,086 B1 * | 9/2002 | Houston ....................... | 307/24 |
| 6,476,519 B1 | 11/2002 | Weiner | |
| 6,639,383 B2 | 10/2003 | Nelson et al. | |
| 6,735,096 B2 | 5/2004 | Chang et al. | |
| 6,854,065 B2 | 2/2005 | Smith et al. | |
| 2002/0071292 A1 * | 6/2002 | Aihara et al. ................. | 363/20 |
| 2003/0080623 A1 * | 5/2003 | MacDonald et al. .......... | 307/72 |
| 2003/0107906 A1 * | 6/2003 | Tokunaga et al. ............. | 363/89 |
| 2005/0084745 A1 * | 4/2005 | Colello et al. ................. | 429/61 |

* cited by examiner

*Primary Examiner*—Michael Sherry
*Assistant Examiner*—Daniel Cavallari
(74) *Attorney, Agent, or Firm*—Hope Baldauff Hartman LLC

(57) ABSTRACT

An apparatus, system, and method for supplying an uninterruptible power source to a dual power device capable of being alternately powered through either a primary power input connected to a primary power source or a secondary power input connected to a secondary power source is provided. One implementation includes a power input for receiving AC from the primary power source, one or more converter elements operative to receive the AC from the power source, to convert the AC to DC, and to deliver the DC to a power storage element. The apparatus also includes a power storage element that stores at least a portion of the DC delivered from the converter elements. The power stored in the power storage elements is delivered to the secondary power input of the dual power device when the primary power source is disconnected from the dual power device. The apparatus may further include a control circuit for disconnecting the power storage elements from the secondary power input and from the converter elements in response to detecting thermal runaway in the power storage elements.

4 Claims, 8 Drawing Sheets

HYBRID UNINTERRUPTIBLE POWER SUPPLY SYSTEM

CROSS-REFERENCE TO RELATED APPLICATIONS

This patent application is related to, and claims the benefit of, U.S. provisional patent application No. 60/684,840, entitled "Hybrid Uninterruptible Power Supply (UPS) System," which was filed on May 26, 2005, and which is expressly incorporated herein by reference in its entirety.

TECHNICAL FIELD

The disclosure provided herein relates generally to the field of uninterruptible power supply ("UPS") systems.

BACKGROUND

In certain industries, the unwanted failure of electrical equipment due to the loss of power cannot be tolerated. For instance, because people depend on their telephones to communicate in emergency situations, telecommunications systems must maintain continuity of service even in the face of power failures. In order to accomplish this, power must be provided in an uninterrupted fashion to the equipment in the telecommunications system. UPS systems are very useful in helping to prevent the unwanted failure of telecommunications equipment due to the loss of power.

In general, there are two primary methods of providing uninterrupted input power to a telecommunications system. One type of system is a direct current ("DC") power system (referred to herein as a "DC system"). In a DC system, power for the telecommunications equipment is provided by the local utility, which in most instances is alternating current ("AC") power. The AC power provided by the local utility is rectified into DC and applied across batteries connected to the telephone equipment load. The DC provides trickle charge to the batteries keeping them in a fully charged condition. The DC also recharges the batteries after the batteries have been used during an AC power outage.

The other primary method of providing uninterrupted input power to a telecommunications system is an AC power system (referred to herein as an "AC system"). In an AC system, power for the telecommunications equipment is provided by the local utility, which in most instances is AC power. AC power is rectified into DC by a single rectifier. The rectified DC is then fed to a battery string for trickle charge and recharge purposes. An inverter circuit is utilized to transform the DC into AC. When there is a loss of utility power, the batteries become the prime energy source. The output of the inverter circuit is distributed to equipment requiring continuity of AC input power.

Although AC and DC systems have long been the primary choice for providing uninterruptible power to telecommunications equipment, these systems do suffer from several significant drawbacks. In particular, because AC systems only include a single rectifier and inverter, loss of either of these units can result in loss of UPS output. Both AC and DC systems also require significant floor space and generate considerable floor weight loads as a result of the weight of their batteries. Moreover, these previous systems require complex and expensive power cable and associated labor to install.

It is with respect to these considerations and others that the embodiments of the present invention are made.

SUMMARY

The embodiments described herein provide a hybrid UPS system that operates in conjunction with dual power input devices. In particular, according to one specific embodiment, an apparatus for providing an uninterruptible power source to a dual power device capable of being alternately powered through either a primary power input connected to a primary power source or a secondary power input connected to a secondary power source is provided.

According to one aspect, the apparatus provided herein includes a power input for receiving AC from the primary power source. The apparatus also includes one or more converter elements operative to receive the AC from the power input, to convert the AC to DC, and to deliver the DC to a power storage element. In one implementation, the converter elements are rectifiers operative to convert the AC to DC.

The apparatus also includes one or more power storage elements connected to the converter elements. The power storage elements are operative to store at least a portion of the direct current delivered from the converter elements. The power storage elements may comprise lead acid batteries connected in parallel. The power stored in the power storage elements is delivered to the secondary power input of the dual power device when the primary power source is disconnected from the dual power device.

According to one particular embodiment, the primary power source is an AC power source and the primary power input of the dual power capable device is operative to receive AC power. The secondary power source is a DC power source and the secondary power input of the dual power capable device is operative to receive DC power.

According to other aspects, the apparatus may further include a control circuit for disconnecting the power storage elements from the secondary power input and from the converter elements in response to detecting thermal runaway in the power storage elements. In one particular implementation, the control circuit includes a controller for monitoring a current sensor to detect thermal runaway and to disconnect the power storage elements from the secondary power input and from the converter elements in response to detecting thermal runaway. The control circuit also includes a current sensor attached to the controller and to the power storage elements. The control circuit also includes a disconnect relay connected to and controlled by the controller for disconnecting the power storage elements from the secondary power input and from the converter elements.

According to other aspects, the apparatus may include an inverter connected to the power storage elements for converting DC stored in the power storage elements to AC. The inverter may be configured so that it can be easily removed or added to the apparatus. According to other implementations, the apparatus may further include a full-wave rectifier circuit for converting AC received at the primary power input to DC and for delivering the DC to the secondary power input while AC is present at the primary power input.

The subject matter described herein may also be embodied in a system for providing uninterruptible power to a dual power input capable device. The features described in this summary and various other features, as well as advantages, which characterize the embodiments described herein, will be apparent from a reading of the following detailed description and a review of the associated drawings.

DETAILED DESCRIPTION

Figure 1:
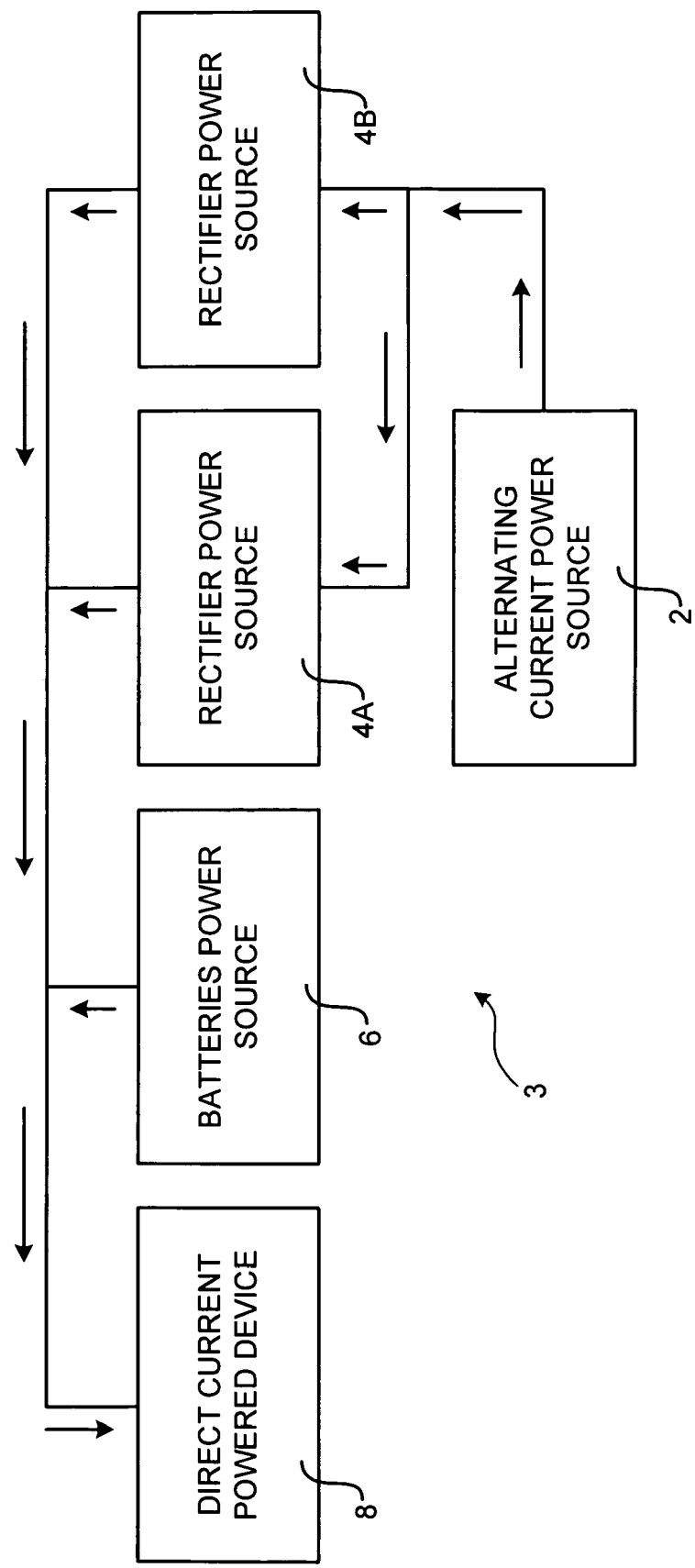
FIG. 1 is an abstract circuit diagram illustrating aspects of a prior art DC system.

As discussed briefly above, there are two common prior methods of providing uninterrupted input power to a telecommunications system, DC systems and AC systems. FIG. 1 illustrates a prior art DC system. In this system, the telecommunications equipment is a DC powered device 8, such as a telecommunications switch. Power for the DC system is provided through an AC power source 2 supplied by the local power utility.

The AC power provided by the local utility is rectified by multiple parallel rectifiers 4A-4B into DC and applied across the batteries 6. Typically, 24 cells are utilized for nominal 48VDC. The batteries 6 are connected in parallel with the telephone equipment load, the DC powered device 8. The outputs of the rectifiers 4A-4B provide trickle charge to the batteries 6 keeping them in a fully charged condition. The rectifiers 4A-4B also recharge the batteries 6 after the power stored in the batteries 6 has been used during an AC power outage.

Figure 2:
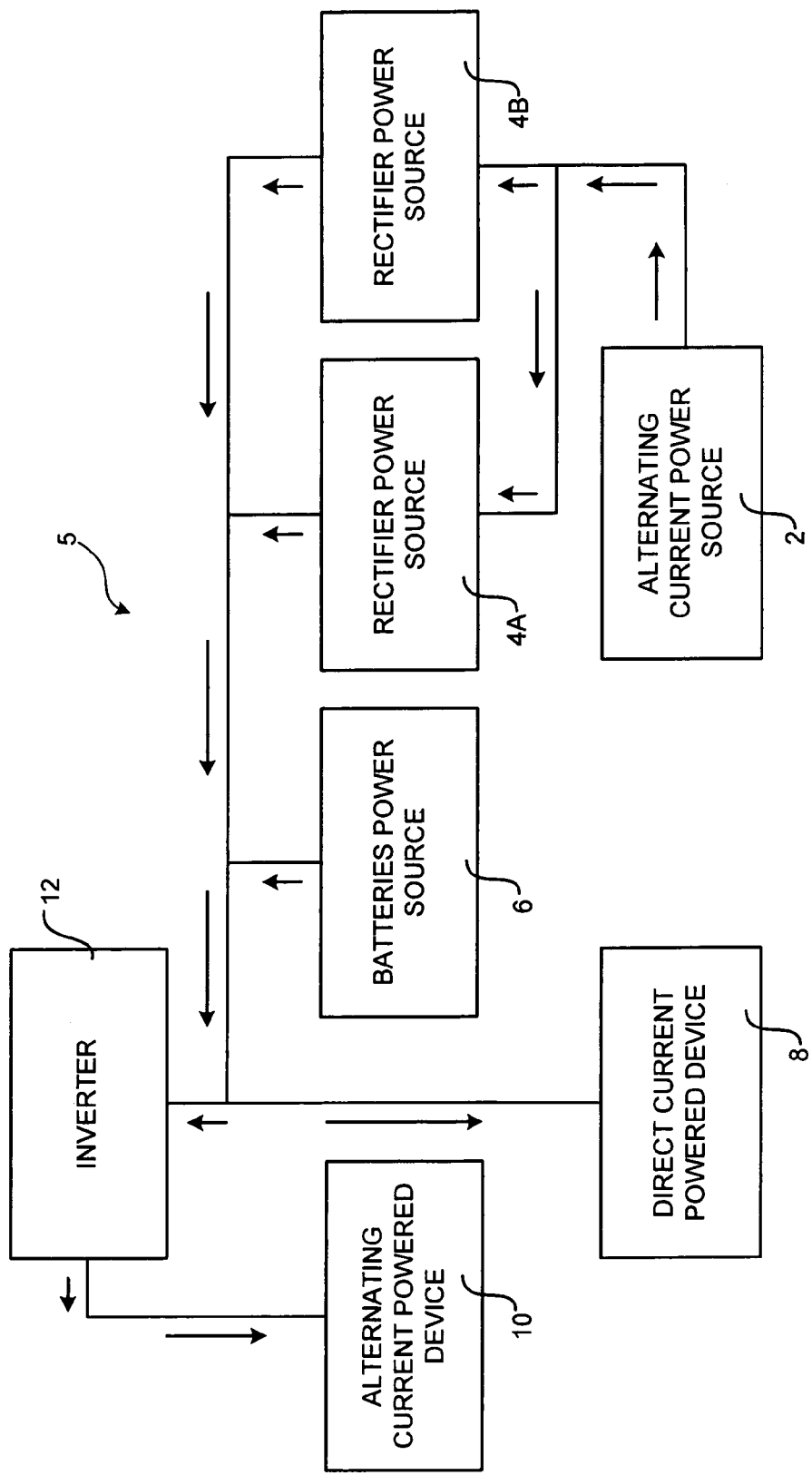
FIG. 2 is an abstract circuit diagram illustrating aspects of a prior art DC system employing the use of an inverter.

When continuity is needed for equipment that is powered directly by AC, an inverter may be used. FIG. 2 shows an illustrative DC system that also includes an inverter 12. Through the use of the inverter 12, the DC stored in the batteries 6 can be converted to AC to power an AC powered device 10 in the event of the loss of AC from the AC power source 2. This system is considered a "telephone power plant" and ranges in sizes from 2 kw to 540 kw or more. Physical size of these plants depends upon the rectification technology employed. In general, however, these power plants are large, complex, and expensive.

Figure 3:
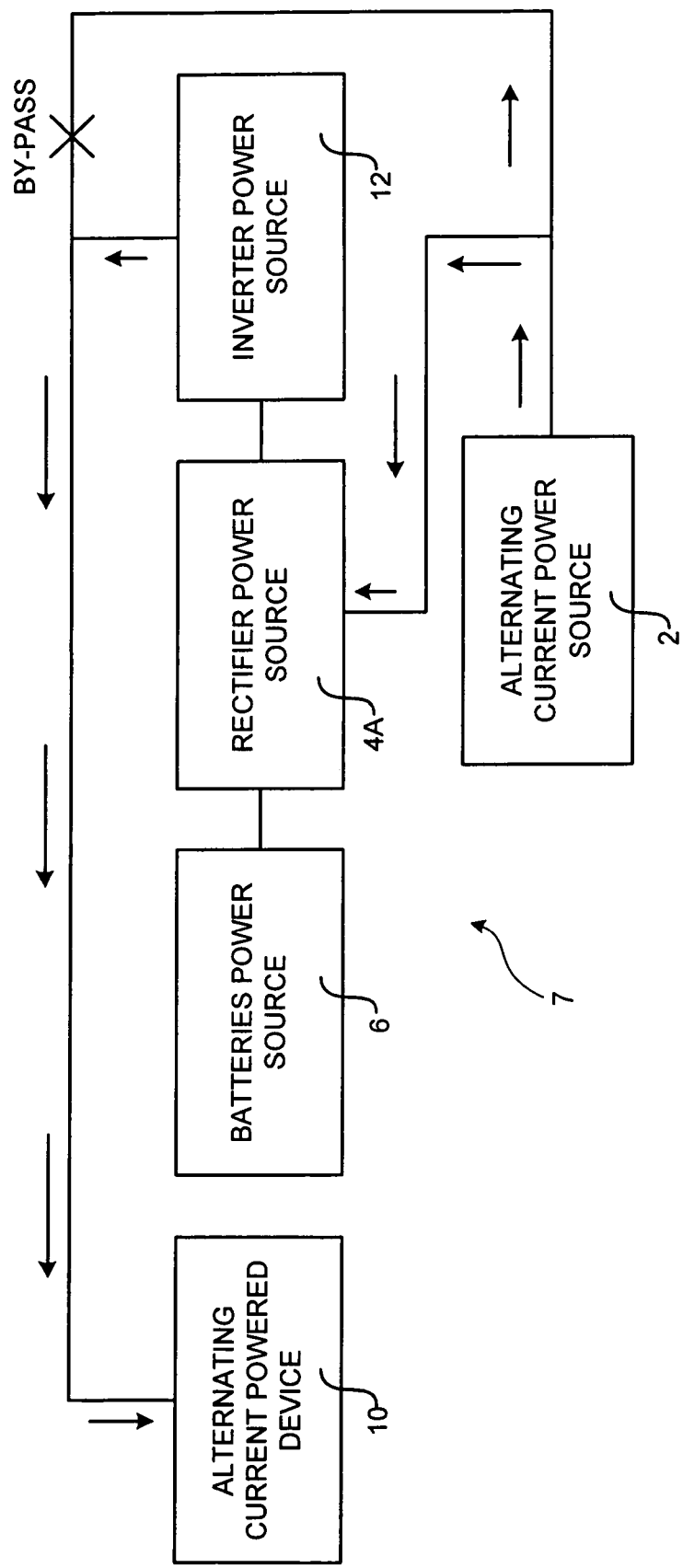
FIG. 3 is an abstract circuit diagram illustrating aspects of a prior art AC system.

As also discussed briefly above, the other primary method of providing uninterrupted input power to a telecommunications system is an AC power system. FIG. 3 illustrates a sample prior art AC power system. In an AC power system, power is provided in the form of an AC power source 2 supplied by the local utility. In the example AC system shown in FIG. 3, the AC power is rectified into DC by a single rectifier 4A. The rectified DC is then fed to a battery string 6 for trickle charge and recharge purposes. The rectified DC is also fed to an oscillator circuit where it is chopped at a frequency of about 25 k Hertz and fed through the primary of a transformer The resulting 60 Hertz square wave output of the secondary of the transformer is then electronically shaped into a sine wave. The secondary voltage is regulated by PWM ("pulse width modulation") on the primary side of the transformer. The described circuit is considered to be an inverter 12. When there is a loss of utility power, the batteries 6 become the prime energy source. The output of the inverter 12 is distributed to one or more AC powered devices 10. In older technology UPS systems, the rectified DC is fed directly to an inverter instead of an oscillator circuit.

Although AC and DC systems have long been the primary choice for providing uninterruptible power to telecommunications equipment, these systems do suffer from several significant drawbacks. In particular, because AC systems only include a single rectifier and inverter, loss of either of these units can result in loss of UPS output. Both AC and DC systems also require significant floor space and generate considerable floor weight loads as a result of the weight of their batteries and being located in one centralized location. Moreover, because of the required centralized location, these previous systems require complex and expensive power cable and associated labor to install. The centralized location also results in large quantities of conversion devices and complex distribution which results in complex control and alarm topology. Accordingly, the implementations described herein present an alternative to traditional AC and DC systems that may address these shortcomings. The various embodiments provided herein are discussed below with reference to FIGS. 4-8.

Figure 4:
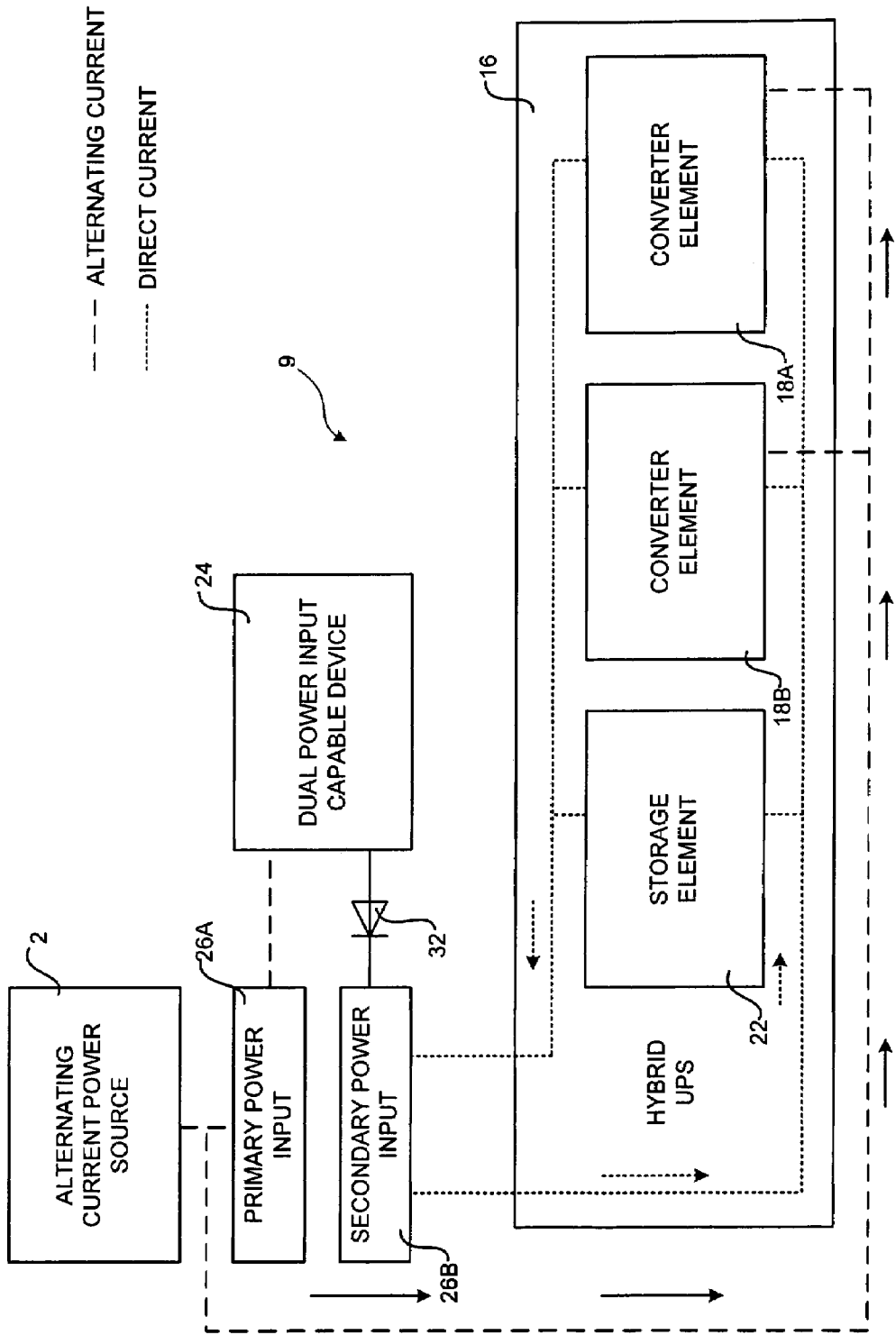
FIG. 4 is an abstract circuit diagram illustrating aspects of a hybrid UPS provided in one implementation described herein.
Figure 5:
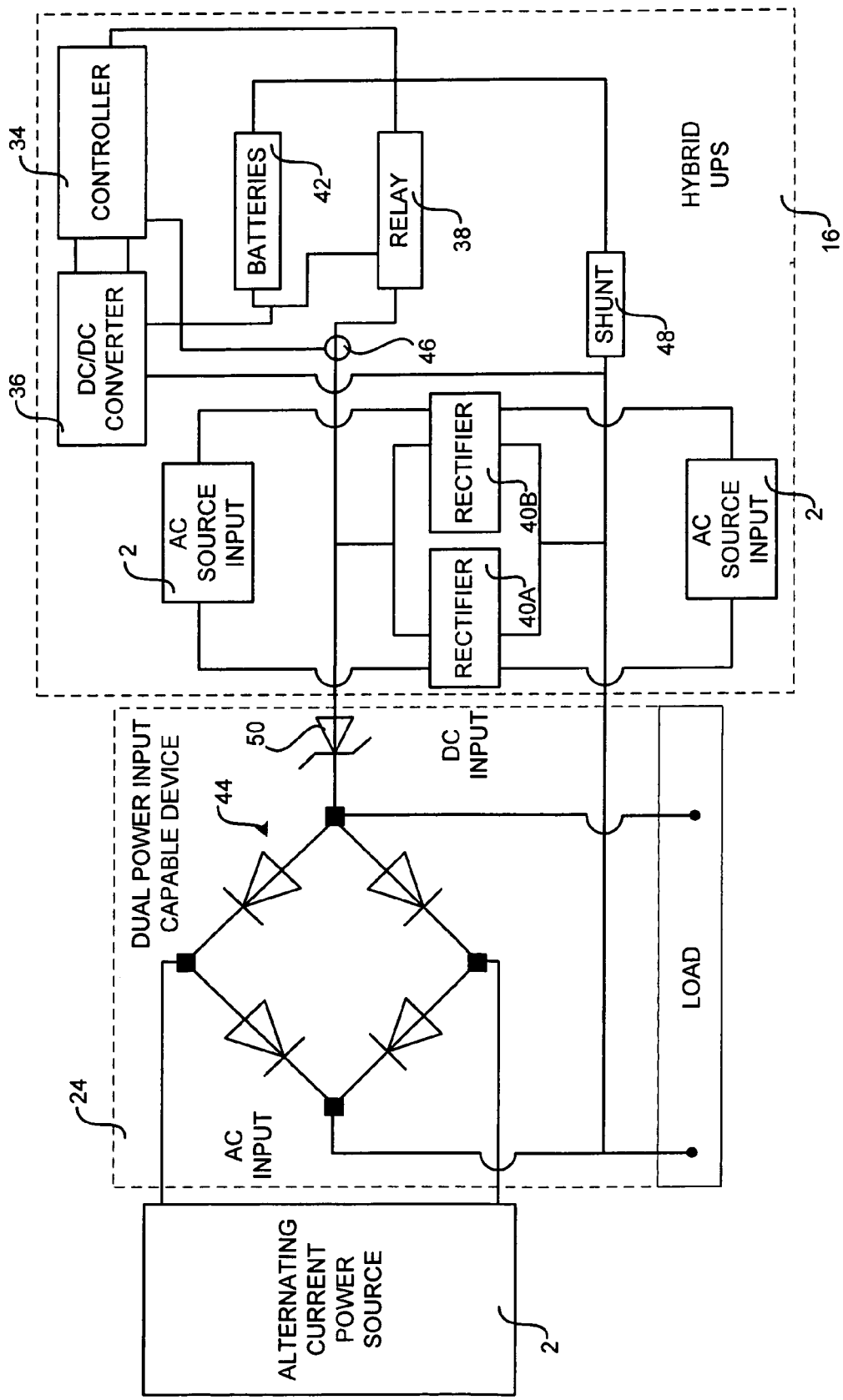
FIG. 5 is a circuit diagram illustrating additional aspects of a hybrid UPS provided in one embodiment presented herein.

FIGS. 4 and 5 illustrate one implementation provided herein for supplying uninterruptible power to electrical equipment, such as that found in a typical telecommunications system. Because the implementations presented herein include characteristics of both AC and DC systems, the embodiments described herein may be referred to as a "hybrid UPS." The hybrid UPS described herein is believed to be superior to either of the aforementioned two methods of providing uninterruptible power to certain types of equipment. In particular, the embodiments described herein are particularly useful in conjunction with recently developed and deployed equipment that allows dual power input (both AC and DC input). This type of equipment typically uses AC as the primary power source and DC as a secondary power source. Some examples of such dual power input capable devices are the G650 and G700 MEDIA GATEWAYS and the S8700 server from AVAYA CORPORATION. It should be appreciated, however, that the embodiments described herein may be utilized with different types of equipment that permits the use of either AC or DC power.

FIG. 4 shows a power system 9 that includes a hybrid UPS 16 as provided in one embodiment of the invention. As shown in FIG. 4, a dual power input capable device 24 is powered by the hybrid UPS 16. The dual power input capable device 24 includes a primary power input 26A and a secondary power input 26B. The dual power input capable device 24 is operative to receive power from either of the inputs 26A-26B. The dual power input capable device 24 is also operative to switch between the inputs 26A-26B at line speed in the event of a failure of power on one of the inputs. Because the transition between the inputs 26A-26B occurs at line speed, no discontinuity of service is experienced by the device 24. In one embodiment, the primary power input 26A is configured to receive AC from an AC power source 2. The secondary power input 26B is configured to receive DC from the hybrid UPS 16. It should be appreciated that the inputs 26A-26B may also be configured in an alternate manner.

As also shown in FIG. 4, the hybrid UPS 16 utilizes the AC power source 2 connected to the primary power input 26A to feed a multitude of converter elements 18A-18B. The converter elements 18A-18B comprise any configuration of electrical components operative to convert AC to DC. The converter elements 18A-18B are connected in parallel to a storage element 22. The storage element 22 comprises any suitable device, or collection of devices, for storing the DC generated by the converter elements 18A-18B and for delivering the stored DC to the dual power input capable device 24 on the secondary power input 26B in the event that power is removed from the primary power input 26A. The converter elements 18A-18B provide trickle charge and recharge power to the storage element 22. A blocking diode 32 may be utilized at the secondary power input 26B of the device 24.

FIG. 5 illustrates additional aspects of a hybrid UPS 16 as provided in one implementation. As shown in FIG. 5, the converter elements 18A-18B in this implementation comprise two low wattage rectifiers 40A-40B connected in parallel. The rectifiers 40A-40B are fed by the AC power source 2 that is connected to the primary input 26A of the device 24. According to one embodiment, the rectifiers 40A-40B comprise 140 watt rectifiers. It should be appreciated that more than two rectifiers may be utilized to provide additional redundancy and capacity.

In this embodiment, the storage element 22 comprises an appropriately sized lead acid battery string 42. In particular, one embodiment uses 48VDC at 40 ah. The negative most terminal of the battery string 42 is connected to an appropriately sized battery output protection circuit breaker (one embodiment uses a 30 amp breaker) and a disconnect relay 38 connected from the breaker, through a current sensor 46 to the negative output of the rectifiers 40A-40B to the negative input of the secondary power input of the device 24. The most positive side of the battery string 42 is connected to the positive DC input of the dual power input device 24. A shunt 48 may also be provided for taking test readings.

According to one embodiment, the current sensor 46 senses battery float or charge current and passes this information to a controller 34. If the current exceeds a predetermined level for a predetermined period of time the controller 34 will generate an alarm. If the alarm is not acted upon in a predetermined time, circuitry will cause the disconnect relay 38 to release which will thereby cut off power into and out of the battery string 42. This protects against battery thermal runaway.

As known to those skilled in the art, thermal runaway is a detrimental and often dangerous condition that can occur in certain types of sealed, valve-regulated lead acid batteries that are used for backup power. This condition can occur when the ambient temperature is 110° F. or higher and/or excessive recharge current is utilized. In either case, a degradation in open circuit cell voltage is caused by high internal temperatures created as a result of either high ambient temperatures or increased $I^2R$ heat from excessive recharge current. In addition, a decrease in open circuit cell voltage results in a larger than normal difference of potential between open circuit cell voltage and float voltage. This abnormally large potential difference produces more than normal float current, which, in turn, produces excessive hydrogen gas, which has proven to be explosive when mixed with air in concentrations of 3% or more by volume. In addition, the excessive float current also produces increased $I^2R$ heat which further degrades open circuit voltage which produces yet additional current. The snowballing effect results in thermal runaway.

According to one embodiment, a controller 34 is utilized to monitor the current sensor 46 and to disconnect the relay 38 in the event that thermal runaway is detected from the readings of the current sensor 46. In one implementation, the controller 34 consists of a programmable logic controller ("PLC") that is operative to interpret the sensed battery current and to initiate timing, alarming, and control. A suitable power source, such as a DC-to-DC converter 36 or zener diode is used to provide power the controller 34.

As shown in FIG. 5, the AC input to the device 24 is configured as the primary power input and is connected to the AC power source 2. The AC power source 2 is also connected to the rectifiers 40A-40B. As a result, in the event that AC is present at the primary input, the rectifiers 40A-40B will provide DC to maintain the batteries 42 in a fully charged condition and will also provide recharge power in the event the batteries are utilized. The hybrid UPS 16 also monitors for battery thermal runaway in the manner described above.

The configuration of the hybrid UPS 16 described herein provides several advantages over the AC systems and DC systems mentioned previously. First, smaller wattage sized rectifiers 40A-40B may be utilized as opposed to those typically utilized in DC systems because the rectifiers 40A-40B are sized only for trickle charge and recharge. Whereas the rectifiers in typical DC systems are wattage sized to provide main telephone power, trickle charge, and recharge. Additionally, in some embodiments presented herein, multiple rectifiers may be utilized as opposed to typical AC systems where only one rectifier is used. This allows greater reliability. The embodiments presented herein also allow significantly reduced size of overall power systems. This allows the hybrid UPS 16 to be integrated into the device 24. Alternatively, the circuitry shown in FIG. 5 for permitting dual power input at the device 24 may be incorporated into the hybrid UPS 16. In particular, the full wave rectifier circuit 44 and its associated circuitry and various output voltages may be integrated into the hybrid UPS 16. It should also be appreciated that the implementations provided herein also require less floor loading, less floor space, less installation effort, less installation personnel training, less maintenance due to smaller sealed batteries with no requirements for large centralized flooded or sealed lead acid batteries, no spill containment, less cost for battery thermal runaway management, and lower overall cost for telephone power as compared to previous systems.

Figure 6:
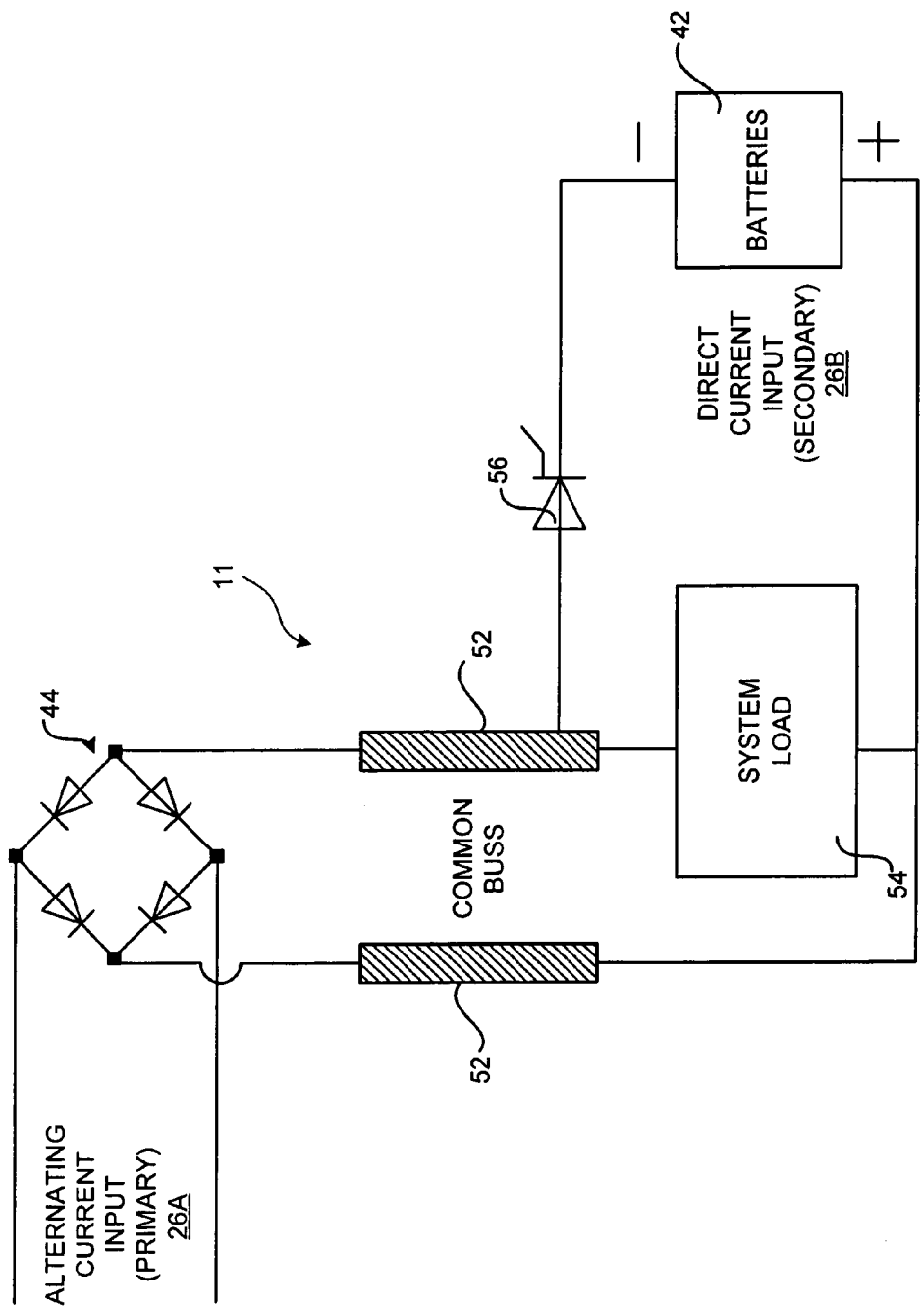
FIG. 6 is a circuit diagram illustrating a portion of the circuitry utilized by a dual power input capable device to operate on either AC or DC power.

FIG. 6 shows a circuit design 11 for the power input portion of a dual power input device 24 that may be utilized with the embodiments presented herein. As shown in FIG. 6, the primary input 26A is rectified by the full wave rectifier circuit 44. The rectified AC feeds a common buss 52 shared with the secondary input 26B. The common buss 52 feeds the system load 54. A regulator circuit is also provided that ensures that the higher input voltage of the two input voltages to the common buss 52 is always the prime power source. The circuit is designed so that the input voltage rectified from the primary input 26A is always higher than the allowable voltage on the secondary input 26B, which is typically 54 VDC.

When the input voltage from the rectified AC input drops to below the DC input (typically 54 VDC) the DC input electronically becomes the source. The switch from the primary input 26A to the secondary input 26B is electronic and not mechanical and is thus at the speed at which electricity flows and is a transparent switch to the system load 54. The transparent switch maintains continuity of electrical service to the system load 54. The reverse happens when the input voltage at the primary input 26A reappears. In one embodiment, the regulator circuit comprises a regulator 56 placed in the circuit between the battery input and the rectified DC input in such a way that the battery input is not allowed to provide power until the common buss 52 voltage drops below a predetermined voltage.

Figure 7:
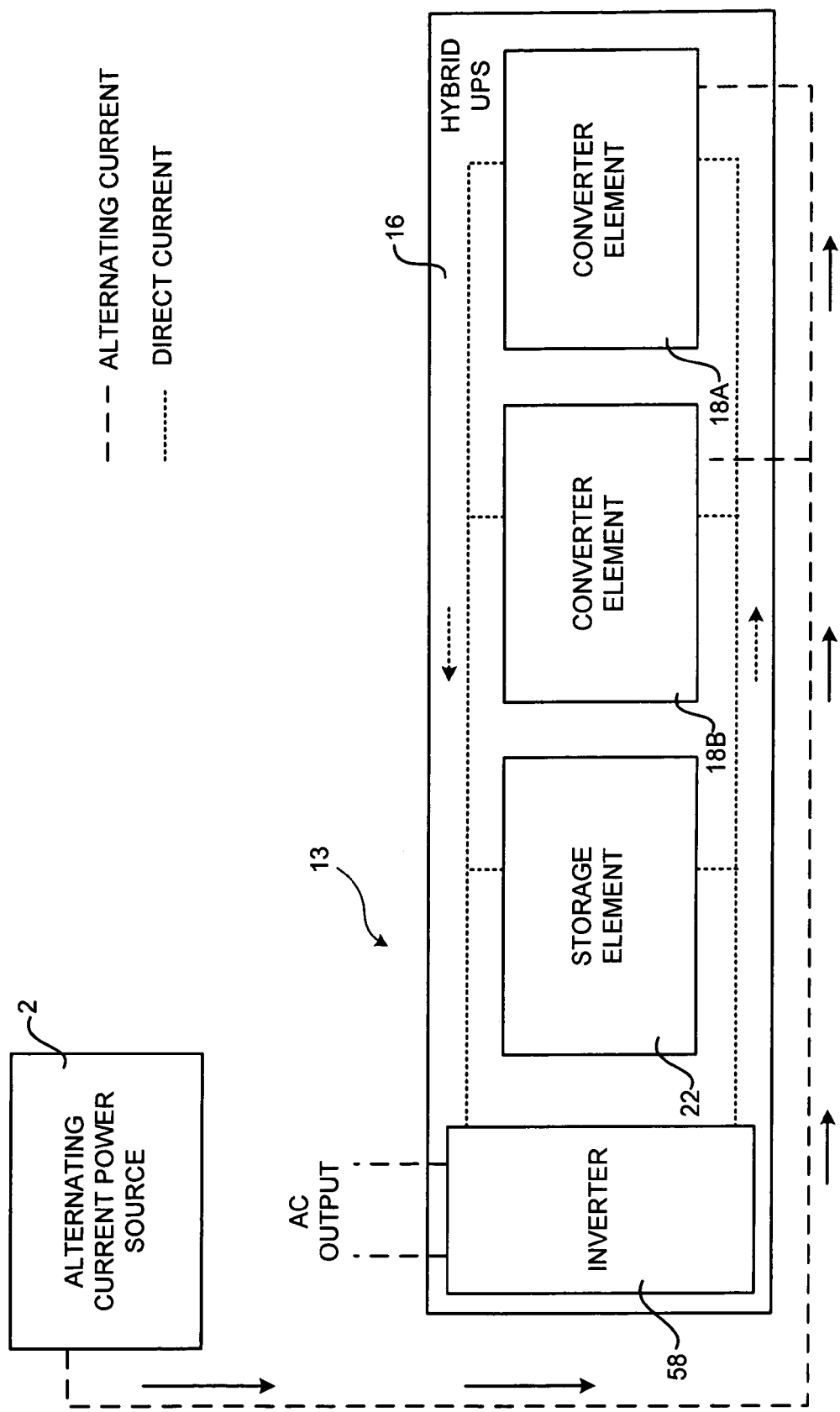
FIG. 7 is an abstract circuit diagram illustrating additional aspects of a hybrid UPS utilized in conjunction with an inverter in one embodiment described herein.

FIG. 7 shows a circuit diagram for a hybrid UPS 16 as provided herein that is utilized in conjunction with an inverter 58. As shown in FIG. 7, the inverter 58 is a part of the hybrid UPS 16 and is connected in series to the storage element 22 and the converter elements 18A-18B. The inverter 58 provides AC at its outputs to power any additional AC powered devices. This allows great flexibility to the operator of the hybrid UPS 16. In one embodiment, the hybrid UPS 16 may ship with the inverter 58 installed and provide a mechanism by which the inverter 58 may later be disconnected or removed from the hybrid UPS 16 by a trained technician. In this manner, an operator of the hybrid UPS 16 can utilize the hybrid UPS 16 as a traditional UPS. When the operator installs dual power input capable devices, the hybrid UPS 16 can be easily converted into and operated as the device shown in and described with reference to FIG. 4.

Figure 8:
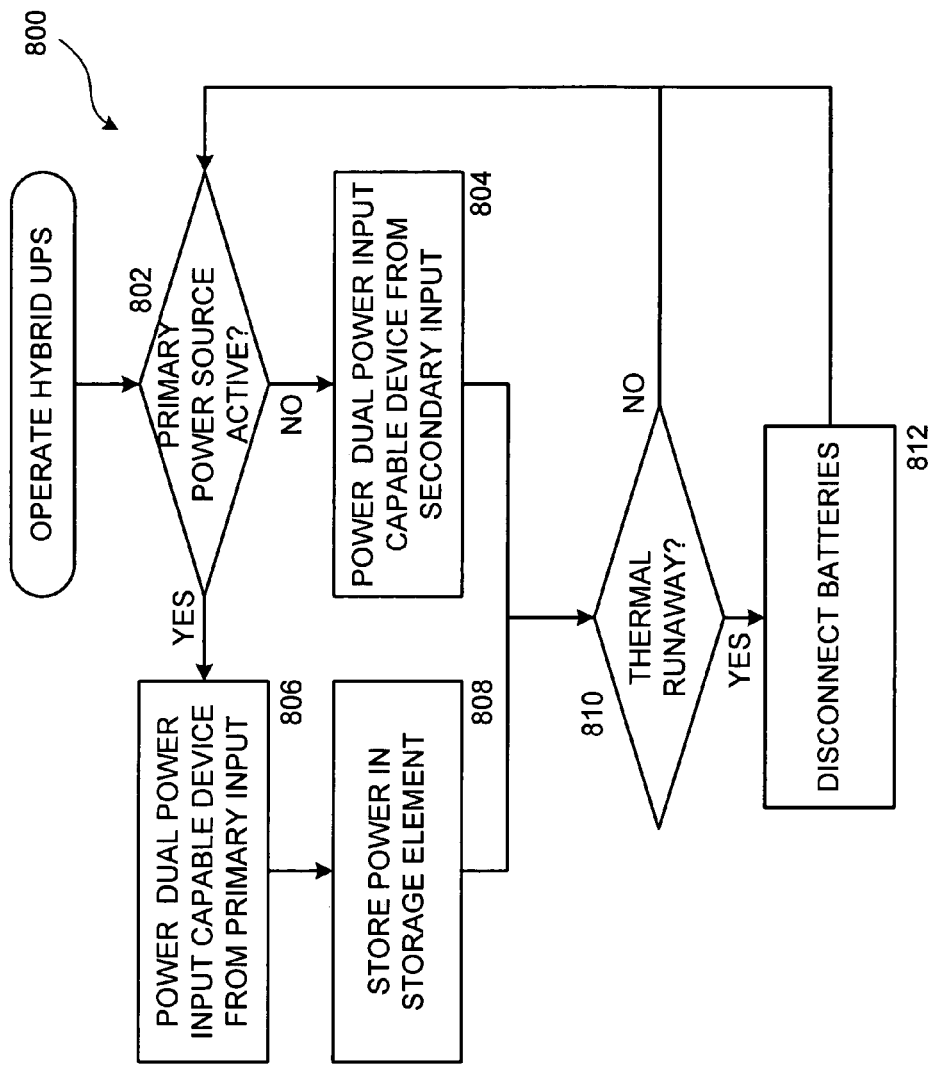
FIG. 8 is a flow diagram illustrating the operation of a hybrid UPS provided herein according to one implementation.

FIG. 8 is a flow diagram illustrating aspects of a routine 800 utilized by a hybrid UPS 16 provided in one embodiment to supply power to a dual input power device 24. The routine 800 begins at operation 802, where a determination is made as to whether power is present at the primary power input 26A (the AC input in one embodiment). If power is present at the primary input 26A, the routine 800 branches to operation 806, where the device 24 is powered from the primary input 26A. The routine 800 then continues to operation 808, where a portion of the power received at the primary input 26A is converted and stored in the storage element 22. From operation 808, the routine 800 continues to operation 810.

If, at operation 802, it is determined that power is not present at the primary power input 26A, the routine 800 continues from operation 802 to operation 804. At operation 804, the device 24 is powered by the hybrid UPS 16 at the secondary input. In particular, stored power is delivered by the storage element 22. The routine 800 then continues to operation 810.

At operation 810, a determination is made as to whether thermal runaway has been detected in the storage element 22. If so, the routine 800 continues to operation 812, where the storage element 22 (the batteries 42 in one implementation) are disconnected. If thermal runaway has not been detected at operation 810, the routine 800 branches back to operation 802, described above.

It should be appreciated that the embodiments of the invention may be utilized with other types of systems for controlling thermal runaway in a battery backup system. As an example, the embodiments of the invention described herein may be utilized in conjunction with the systems for controlling thermal runaway described and claimed in U.S. Pat. No. 5,642,100, which is owned by the inventor of the instant patent application and incorporated by reference herein in its entirety. It should also be appreciated that although the embodiments of the invention described herein are described in the context of providing uninterruptible power to a telecommunications device, the embodiments of the invention may be utilized with any device capable of receiving power input from either AC or DC.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description.

What is claimed is:

1. An apparatus for providing an uninterruptible power source to a dual power device capable of being alternately powered through a primary power input connected to a primary power source or a secondary power input connected to a secondary power source, the apparatus comprising:
   a power input for receiving alternating current (AC) from the primary power source;
   an AC power output connected to the power input for delivering AC to the primary power input of the dual power device;
   one or more converter elements operative to receive the AC from the power input, to convert the AC to direct current (DC), and to deliver the DC to a power storage element;
   the power storage element connected to the one or more converter elements, the power storage element operative to store at least a portion of the direct current delivered from the converter elements, and wherein the stored power is delivered from the power storage element directly to a DC power output when the primary power source is disconnected; and
   the DC power output connected directly to the power storage element for delivering DC to the secondary power input of the dual power device.

2. The apparatus of claim 1, wherein the primary power source comprises an alternating current (AC) power source, and wherein the primary power input is operative to receive AC power.

3. The apparatus of claim 2, wherein the secondary power source comprises a direct current (DC) power source, and wherein the secondary power input is operative to receive DC power.

4. The apparatus of claim 1, further comprising:
   a controller for monitoring a current sensor to detect thermal runaway and to disconnect the power storage elements from the DC power output and from the converter elements in response to detecting thermal runaway;
   a current sensor connected to the controller and to the power storage elements; and
   a disconnect relay connected to and controlled by the controller for disconnecting the power storage elements from the DC power output and from the converter elements.

* * * * *